United States Patent [19]
Keller

[11] Patent Number: 5,262,514
[45] Date of Patent: Nov. 16, 1993

[54] POLYMER FROM DIIMIDO-DI-PHTHALONITRILE

[75] Inventor: Teddy M. Keller, Alexandria, Va.

[73] Assignee: The United States of America as represented by the Secretary of the Navy, Washington, D.C.

[21] Appl. No.: 850,370

[22] Filed: Mar. 12, 1992

[51] Int. Cl.$^5$ .............................................. C08G 73/10
[52] U.S. Cl. .................................... 528/322; 528/220; 528/228; 528/321; 528/331; 528/362; 548/548
[58] Field of Search ............... 528/322, 331, 362, 321, 528/220, 228

[56] References Cited
U.S. PATENT DOCUMENTS

| | | | |
|---|---|---|---|
| 4,645,821 | 2/1987 | Malinge et al. | 528/322 |
| 4,649,189 | 3/1987 | Achar et al. | 528/322 |
| 5,003,039 | 3/1991 | Keller | 528/362 |
| 5,003,078 | 3/1991 | Keller | 548/406 |

Primary Examiner—Harold D. Anderson
Attorney, Agent, or Firm—Thomas E. McDonnell; George A. Kap

[57] ABSTRACT

Substituted and unsubstituted di-phthalonitrile monomers devoid of ether and/or phenoxy groups are solid at room temperature and which monomers are defined by the following general formula:

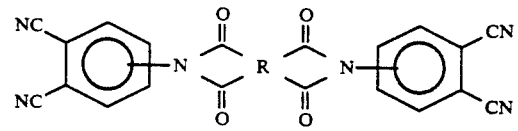

where R is an aromatic tetravalent radical, thermoplastic prepolymers and thermosetting polymers which polymers are solid at room temperature and have a defined glass transition temperature if said polymers are cured at a temperature below a critical temperature or are devoid of a glass transition temperature if said polymers are postcured at a temperature exceeding said critical temperature.

9 Claims, No Drawings

POLYMER FROM DIIMIDO-DI-PHTHALONITRILE

BACKGROUND OF INVENTION

This invention generally relates to certain di-phthalonitrile monomors, to thermoplastic prepolymers and to thermosetting high temperature polymers therefrom. More specifically, this invention relates to di-phthalonitrile monomers, prepolymers and polymers which are solid at room temperature and which are devoid of ether and/or phenoxy groups.

Polymers of di-phthalonitrile monomers are high temperature materials which have a wide range of applications such as in composite materials, as adhesives, as sealants and as semiconductors. These polymers can be prepared from di-phthalonitrile monomers in which the linking group between the two ortho dinitrile groups separates the dinitrile groups enough to permit polymerization of the monomers. Presently, a number of bridging groups are known including aliphatic and unsaturated groups, aromatic groups, aliphatic and aromatic diamide and diimide groups, and aliphatic and aromatic ether, sulfone and ketone groups. For instance, —O—Ar—$C_3F_6$—Ar—O— bridging groups are disclosed by Keller et al U.S. Pat. No. 4,238,601, —O—Ar—$SO_2$—Ar—O— and —O—Ar—CO—Ar—O— bridging groups are disclosed by Keller et al U.S. Pat. No. 4,234,712, —AR—S—A—S—AR— bridging groups are disclosed by Keller et al U.S. Pat. No. 5,004,801, and many others. In the above bridging groups, Ar denotes an aromatic moiety and A denotes aliphatic and cyclic hydrocarbon moieties. The chemical and physical properties of the phthalonitriles depend primarily on the bridging groups.

Various bridging groups of imide-containing di-phthalonitriles are disclosed in Keller U.S. Pat. No. 5,003,078 and in U.S. Pat. No. 5,132,396.

SUMMARY OF INVENTION

An object of this invention is the di-phthalonitrile monomers, prepolymers and polymers which are devoid of ether and/or phenoxy groups.

Another object of this invention is the high temperature polymers which can withstand temperatures in excess of 300° C. without deterioration of thermal and oxidative stability.

Another object of this invention is the polymeric phthalonitriles which are devoid of voids.

Another object of this invention is the polymeric phthalonitriles which have at least one aromatic imide linkage in the bridging groups.

Another object of this invention is the polymeric phthalonitriles which are more resistant to oxidative attack than epoxies, bismaleimides and conventional thermosetting polyimides.

These and other objects of this invention are accomplished by the novel di-phthalonitrile monomers, thermoplastic prepolymers and thermosetting polymers with aromatic imide linkages in the groups bridging the phthalonitrile groups of the di-phthalonitrile moiety.

DESCRIPTION OF INVENTION

The imide-containing di-phthalonitrile monomers of this invention devoid of ether and/or phenoxy groups have the following structure:

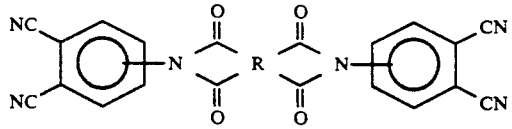

where R is an aromatic tetravalent substituted or unsubstituted radical. The word "substituted", as used herein, includes any known substituent that can be attached to any part of the bridging group. Suitable substituents include, but are not limited to, halogens, chalcogens and organic radicals such as phenyl, hydroxyl, carboxyl, carbonyl and aliphatic groups of less than 10 carbon atoms. The preferred monomers are di-phthalonitrile monomers where R is a tetravalent aromatic radical selected from the following:

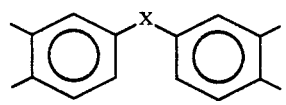

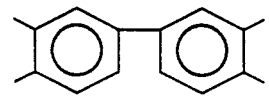

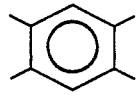

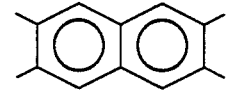

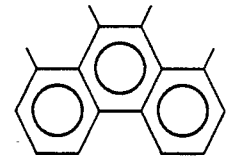

where X is —C(=O)—, —S—, —S(=O)$_2$—, —C(CH$_3$)$_2$—, —C(CF$_3$)$_2$—, an alkylene radical of 1-6 carbon atoms, and partially or perhalogenated alkylene radical of 1-6 carbon atoms. The most preferred diphthalonitrile monomers are where R has the following structure:

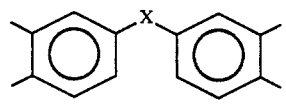

where X is —C(=O)— or —C(CF$_3$)$_2$—.

The imide-containing di-phthalonitrile monomers of this invention can be prepared in a known way by reacting an aminophthalonitrile with an aromatic dianhydride. More specifically, the imide-containing phthalonitrile monomers of this invention can be prepared in solution by reaction of an aminophthalonitrile precursor with an aromatic dianhydride. Upon extraction thereof, as by pouring the reaction mixture into an appropriate precipitating solvent, such as ethanol, complete imidization is achieved thermally in air at 300° C.

Examples of the preferred dianhydrides which are suitable for use in this invention are listed below:

4,4'-(hexafluoroisopropylidene)diphthalic dianhydride,
pyromellitic dianhydride,
3,3',4,4'-benzophenonetetracarboxylic dianhydride,
2,3,6,7-naphthalene tetracarboxylic dianhydride,
3,3',4,4'-diphenyl tetracarboxylic dianhydride,
1,3,5,6-naphthalene tetracarboxylic dianhydride,
2,2'3,3'-diphenyl tetracarboxylic dianhydride,
2,2-bis(3,4-dicarboxyphenyl)propane dianhydride,
bis(3,4-dicarboxyphenyl)ether dianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(3,4-dicarboxyphenyl)sulfone dianhydride,
benzene-1,2,3,4-tetracarboxylic dianhydride,
4,4'-oxydiphthalic dianhydride, and
4,4,-thiophthalic dianhydride.

The most preferred dianhydrides are 3,3',4,4'-benzophenonetetracarboxylic dianhydride and 4,4'-(hexafluoroisopropylidene)diphthalic anhydride.

The di-phthalonitrile thermosetting polymers of this invention contain the repeating unit represented by the following formula:

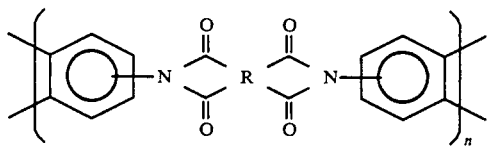

The value for n has no upper limit since the polymer is thermosetting. The R in the above formula is as described.

Polymerization of the phthalonitrile monomer can be accomplished by heating the monomer above its melting point in presence of a curing agent, continuing heating at a temperature above the glass transition temperature of the prepolymer amorphous state until the molten mixture reaches its gelation point, finish curing the mixture to complete crosslinking of the polymer and postcuring at a temperature from above the glass transition temperature of the polymer up to just below the carbonization temperature. The resins or polymers can also be prepared by dissolving the di-phthalonitrile monomer in a solvent, such as acetonitrile, adding a curing agent, such as a primary amine, to form a suspension, heating the suspension to the B-stage, quenching the suspension, removing the solvent, and heating the residue at a temperature from about its melting point to about the decomposition temperature of the resin. As used herein, the term "polymer" includes homopolymers, copolymers and oligomers or prepolymers, each of which has two or more repeating units.

The prepolymer can also be prepared in a different manner. The monomer and a curing agent can be heated for up to 28 hours to any viscosity desired by a fabricator or any one else and quenched at a stage before gelation occurs. The resulting thermoplastic prepolymer can be pulverized and stored indefinitely at room temperature without further reaction. When needed, the prepolymer can be processed above the glass transition temperature, which has been greatly suppressed relative to the original melting point of the monomer. The curing cycles for the prepolymer can be the same as those recommended for the polymer resin. The stability of the prepolymer at ambient temperature is particularly appealing for the preparation of prepregs and their applications as laminates for fiber-reinforced composites.

Examples of cure cycles for neat polymerization are (1) a two part cure of 225°-280° C. for 6-20 hours and 300°-315° C. for 10-20 hours; (2) a three part cure of 225°-280° C. for 6-16 hours, 240°-300° C. for 2-6 hours and 300°-315° C. for 5-16 hours. The preferred two part cure is 240° C. for 17 hours and 315° C. for 16 hours. The preferred three part cure is 225° C. for 16 hours, 280° C. for 6 hours and 315° C. for 16 hours. The most preferred cure is the three part cure. After the cure cycle is complete, a postcure can be carried out to improve the mechanical and thermal properties of the material. The preferred postcure is 325°-365° C. for 2-6 hours and 365°-385° C. for 5-24 hours. The most preferred postcure is 350° C. for 4 hours and 375° C. for 12 hours. When postcure temperatures are in excess of 315° C., heating under an inert atmosphere, such as nitrogen or argon, is recommended.

It should be understood that the cure cycles and postcures given above are not intended to be complete and all inclusive. Other cure cycles and postcures are possible depending on variations in time, temperature and curing agents.

The time and temperature needed for polymerization can be reduced by curing the phthalonitrile monomers in the presence of curing agents, such as amine curing agents, that are stable at the initially required processing temperatures. These curing agents do not volatilize during the polymerization reaction. The amine curing agents are of the general formula $YNH_2$ where Y is an aromatic group. The amount of the amine or another curing agent should be in the range of 0.01 to 10 weight percent based on the weight of the molten monomer. The preferred amount of the curing agent is 1 to 5 weight percent and the most preferred, is 1.0 to 2.0 weight percent.

Keller U.S. Pat. No. 4,408,035 discloses the use of amine curing agents for polymerizing or curing phthalonitrile monomers. The most preferred amine curing agents are believed to be 4-aminophenyl sulfone, 4-aminophthalonitrile and 1,3-bis(3-aminophenoxy)benzene on account of their high boiling points, low vapor pressure and high decomposition temperature. Keller U.S. Pat. No. 4,410,673 discloses phenolic compounds which can be used to polymerize phthalonitrile monomers. Examples of suitable phenolic compounds include bisphenol-A, bisphenol-S, 4,4'-dihydroxydiphenyl and bisphenol-A polysulfones. Phosphazenes and certain acids can also be used alone or together with an amine to polymerize or cure diphthalonitrile monomers.

Polymerization and thus processability of phthalonitrile monomers are somewhat difficult due to the high melting points of these monomers compared to the bisphenol-based phthalonitriles. A reduction in the viscosity can be achieved by copolymerizing the imide-containing phthalonitrile with bisphenol-based phthalonitriles. In this mode, the bisphenol-based phthalonitriles behave as reactive plasticizer. As the term implies, the role of the reactive plasticizer is to improve the processability and then, through reaction with the imide-containing phthalonitriles and itself, become a part of the cured resin system. Blends of imide-containing phthalonitrile and bisphenol-based phthalonitrile can be fabricated without seriously compromising the use properties. The amount of bisphenol-based phthalonitrile is in the range from 10% to 50% by weight. The preferred amount is in the range from 20% to 30% by weight and the most preferred amount is approximately 25% by weight.

A general formula of the internal plasticizer for phthalonitriles is as follows:

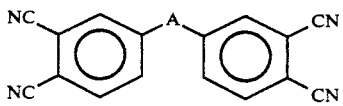

where A is any divalent organic radical, for example, a bisphenol group, a diether group or a dithioether group. The preferred di-phthalonitrile monomers used for plasticization are those in which A in the formula above is a diether group, —O—R'—O. The most preferred diphthalonitrile monomers are those wherein R' is selected from the class consisting of —Ar—$C_3H_6$—Ar—, —Ar—$C_3F_6$—Ar—, —$C_aH_{2a}$—, —Ar—Ar—, —Ar—S(=O)$_2$—Ar—, —Ar—C(=O)—Ar— and —Ar—, wherein Ar is an aromatic group such as phenyl group and "a" is any integer. The phenyl groups are linked at the para and the meta positions. The plasticizer phthalonitrile monomers copolymerize with the imide-containing phthalonitrile monomers to form a copolymer with a repeating unit which also includes the plasticizer phthalonitrile monomer.

It is possible with the present invention to include a metal or metal salt in the resins to facilitate curing. For composite fabrication, however, a metal or a metal salt would be less desirable because of problems with homogeneity and gassing.

The imide-containing phthalonitrile monomers of this invention, which can be derived from aminophthalonitriles and aromatic dianhydrides, are important precursors for the controlled synthesis of the novel diphthalonitrile resins disclosed herein. Such resins can be used as matrix materials for advanced high temperature composites.

The phthalonitrile resins of the present invention containing aromatic and imide linkages exhibit outstanding oxidative properties with catastrophic degradation occurring between 550° C. and 600° C. Due to the short linkage between the terminal phthalonitrile moieties, the polymers are generally highly crosslinked and thus brittle. These polymers are designed to compete with the polybenzimidazoles for high temperature applications. The polybenzimidazoles are cured at temperatures in excess of 370° C. and up to 450° C. for long periods of time. During the curing cycle, volatiles are emitted resulting in high void levels in composite components. During polymerization of the phthalonitrile resins pertaining to this invention, volatiles are not formed after the polymerization reaction commences making it possible to fabricate void-free composite components.

Curing of the imide-containing phthalonitriles with matals/metal salts yielding polyphthalocyanine formation as the polymerization reaction progresses has been previously reported. In these instances, stoichiometric amounts of curing agent to phthalonitrile monomer were used to ensure polyphthalocyanine formation. These are heterogeneous reactions. Thus, it is extremely difficult to keep the curing component in intimate contact with the monomer throughout the polymerization medium as the viscosity increases. The present invention is concerned with using small amounts of curing agents and the curing agents must be thermally stable at the required processing temperatures. When small amounts of curing agents are used, different polymers, relative to the usage of stoichiometric quantities of curing agents, are believed to be formed from reaction with phthalonitrile monomers, which reactions yield polytriazine and/or polyamidine formations. When stoichiometric quantities of curing agents are used in the polymerization or curing of phthalonitriles, it is believed that other or different macromolecules are formed as the polymerization reaction progresses. Thus, different polymerization products are formed when small amounts of curing agents are used relative to the usage of stoichiometric amounts of curing agents.

Thermal and oxidative stability of cured phthalonitrile-based polymers seems to be dependent on the quantity of curing agent used. Besides the different polymerization products formed as a function of the quantity of the curing agent used i.e., triazine and amidine versus macromolecular formation, the thermo-oxidative stability of the cured polymer appears to diminish as the quantity of the curing agent is increased. It is believed that the poor resistance to heat in an oxidizing environment is due to catalyzed oxidation.

The examples which follow are given as particular embodiments of this invention to demonstrate the practice and advantages thereof. It is understood that examples are given by way of illustration and are not intended to limit in any manner the specification or the claims that follow.

EXAMPLE 1

This example demonstrates preparation of an imide-containing phthalonitrile monomer of this invention by reacting 4-aminophthalonitrile with 4,4'-(hexafluoroisopropylidine)diphthalic anhydride.

The anhydride in amount of 4.0 grams or 9.0 mmol was weighed into a 3-necked, round bottom flask and 24 ml of dimethylformamide was added to the flask at room temperature. After flushing the homogeneous solution for 1 hour with dry nitrogen, 4-amimophthalonitrile in amount of 2.6 g or 18.2 mmol was added to the flask in one portion. The resulting slightly cloudy mixture was stirred at 90° C. for 1.5 hours followed by addition of toluene to the flask. The reaction mixture in the flask was refluxed for 16 hours and water that was formed as a by-product was removed using a Dean Stark trap. While refluxing the reaction mixture, the extent of reaction was monitored by Fourier Transform Infrared Spectrophotometer. Upon cooling, the product mixture was poured into 100 ml of absolute ethanol. The resulting white precipitate was collected by suction filtration and was washed several times with ethanol to yield 4.9 g (96%) of the imide-containing phthalonitrile, m.p. 384°–386° C.

EXAMPLE 2

This example demonstrates preparation of an imide-containing phthalonitrile monomer of this invention devoid of ether and phenoxy groups by reacting 4-aminophthalonitrile with 3,3',4,4'-benzophenonetetracarboxylic dianhydride.

The anhydride in amount of 5.0 g or 15.5 mmol was weighed into a 3-necked, round bottom flask, followed by the addition to the flask of 30 ml of dimethylformamide. After flushing the solution in the flask for 1 hour with dry nitrogen, 4-aminophthalonitrile in amount of 4.5 g or 31.5 mmol was added to the flask in one portion at room temperature. The solution was stirred under ambient conditions for 1 hour. At this time, the temperature was increased to 90° C. and the solution was held at this temperature for 1.5 hours. Toluene was added as an azeotropic solvent to the flask to control the reflux temperature at about 140°–145° C. Water that was formed as a by-product was removed by distillation. Total reflux time was 19 hours. Little difference was observed in the Fourier Transform Infrared Spectrophotometer spectra of the product mixture after refluxing at 12 hours versus 19 hours. Upon cooling, the product mixture was poured into absolute ethanol. The resulting white precipitate was collected by suction filtration and washed several times with ethanol to yield 6.7 g (76%) of the desired imide-containing phthalonitrile, m.p. 272° C.

EXAMPLE 3

This example demonstrates polymerization of the phthalonitrile monomer of Example 1 with a small amount of hexakis (4-aminophenoxy)cyclotriphosphazine, a phosphazine curing agent.

The imide-containing phthalonitrile in amount of 1.0 g was weighed into an aluminum planchet, melted, and degassed for 1 hour at 340° C. at reduced pressure. After melting the sample, hexakis(4-aminophenoxy)cyclotriphosphazene in amount of 0.01 g or 1 percent by weight was added with stirring. After the addition, the temperature was reduced to 310° C. and heated at this temperature in air for 16 hours. Solidification had occurred after 1 hour of heat treatment. A portion of the void-free sample was further postcured under an inert atmosphere at 350° C. for 4 hours and at 375° C. for 12 hours. The cured and postcured samples showed similar thermo-oxidative stability. Thermogravimetric analysis studies showed excellent oxidative stability up to 550° C. Moreover, the postcured sample did not exhibit a glass transition temperature ($T_g$) as determined by differential scanning calorimetry. Catastrophic degradation occurred between 550° and 600° C. in a flow of air at 50 cc/min.

EXAMPLE 4

This example demonstrates polymerization of the phthalonitrile monomer of Example 2 with a small amount of hexakis(4-aminophenoxy)cyclotriphosphazine, a phosphazine curing agent.

The imide-containing phthalonitrile in amount of 0.5 g was weighed into an aluminum planchet, melted, and degassed at 270° C. at reduced pressure. To the melt of the sample was added hexakis(4-aminophenoxy)cyclotriphosphazene in amount of 0.01 g or 2 percent by weight with stirring at 270° C. After approximately 5 minutes of heating at 270° C. to ensure the initial reaction of the curing agent with the monomer and to convert the polymerization medium into the amorphous phase, the sample was cooled. The resulting amorphous sample was then cured by heating at 250° C. for 7 hours, at 280° C. for 6 hours, and at 315° C. for 16 hours. A portion of the void-free sample was postcured under an inert atmosphere at 350° C. for 2 hours and at 375° C. for 8 hours. The cured and postcured samples showed similar thermo-oxidative stability. The samples exhibited excellent oxidative stability up to 550° C. with catastrophic degradation occurring at 550°–600° C. The cured sample did not display a $T_g$.

EXAMPLE 5

This example demonstrates polymerization of the phthalonitrile monomer of Example 2 with a small amount of stannous chloride dihydrate, a metal salt curing agent.

The imide-containing phthalonitrile in amount of 1.0 g was weighed into an aluminum planchet, melted, and degassed at 270° C. at reduced pressure. To the melt of the sample was added stannous chloride dihydrate in amount of 0.01 g or 1 percent by weight. Stannous chloride dihydrate and stannous chloride have melting points of 38° C. and 247° C., respectively. Five minutes after the addition of curing agent, the sample was completely in the amorphous phase and the mixture was placed in an oven preheated to 250° C. The mixture was then cured by heating at 250° C. for 7 hours, at 280° C. for 6 hours, and at 315° C. for 16 hours. A portion of the sample was postcured under an inert atmosphere at 350° C. for 4 hours and at 375° C. for 12 hours. The cured sample displayed a $T_g$ of 340° C. as determined by DSC. The postcured sample did not exhibit a characteristic $T_g$. Both samples showed excellent oxidative stability up to 550° C. with catastrophic degradation occurring at 550°–600° C. However, the rate of decomposition occurred more rapidly for the postcured sample.

EXAMPLE 6

This example demonstrates polymerization of the phthalonitrile monomer of Example 2 with 1,3'-bis(3-aminophenoxy)benzene, an amine curing agent.

The imide-containing phthalonitrile in amount of 0.4 g was weighed into an aluminum planchet, melted, and degassed at 300° C. at reduced pressure. To the melt of the sample at 270° C. was added with stirring 1,3'-bis(3-aminophenoxy)benzene in amount of 6 mg or 1.5 weight percent. After heating at 270° C. for 30 minutes, the sample had not gelled but had increased in viscosity. The sample was then placed in a preheated oven at 280° C. and cured by heating at 280° C for 6 hours and at 315° C. for 16 hours.

EXAMPLE 7

This example demonstrates polymerization of a blend of the imide-containing di-phthalonitriles to form a copolymer.

In this example, 5.0 g of the imide-containing phthalonitrile monomer of Example I and 5.0 g of 2,2-bis[4-(3,4-dicyanophenoxy)phenyl]hexafluoropropane were weighed into aluminum planchet, melted and degassed at 300° C. at a reduced pressure. To the melt at 300° C. was added with stirring 10 milligrams or 1 percent by weight of the two phthalonitrile monomers, hexakis(4-aminophenoxy)cyclotriphosphazene. After 10 minutes, the sample was placed in an oven preheated to 270° C. and heated at this temperature for 4 hours. The sample was further cured at 315° C. for 10 hours. The sample was then postcured under an argon atmosphere at 350° C. for 4 hours and at 375° C. for 4 hours. The thermal and oxidative properties of the sample or the copolymer were similar to the homopolymer of Example 3.

EXAMPLE 8

This example also demonstrates polymerization of a blend of other imide-containing di-phthalonitriles to form a copolymer.

Here, 0.4 g of the phthalonitrile monomer of Example 2 and 0.1 g of 4,4'-bis(3,4-dicyanophenoxy)biphenyl were weighed into an aluminum planchet, melted, and degassed at 250° C. under reduced pressure. To the melt at 250° C. was added with stirring 10 mg or 2 weight percent of hexakis(4-aminophenoxy)cyclotriphosphazene. After 10 minutes, the sample was placed in an oven preheated at 250° C. and heated at this temperature for 2 hours, at 280° C. for 4 hours, and at 315° C. for 8 hours. The cured sample was further postcured in an argon atmosphere at 350° C. for 2 hours and at 375° C. for 8 hours. The resulting postcured sample or copolymer exhibited superb thermal and oxidative properties.

What is claimed is:

1. A thermosetting polymer consisting essentially of repeating units of the following general formula:

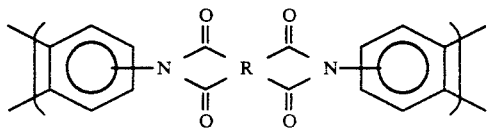

wherein R is selected from the group consisting of the following substituted and unsubstituted radicals:

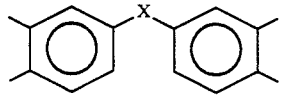

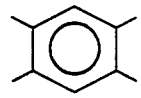

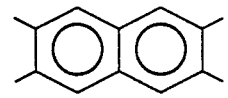

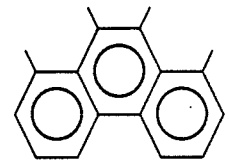

where X is —C(=O)—, —S—, —S(=O)$_2$—, —C(CH$_3$)$_2$—, —C(CF$_3$)$_2$—, or a partially or perhalogen alkylene radical of 1 to 6 carbon atoms.

2. Polymer of claim 1 wherein R is an aromatic tetravalent radical or substituted trivalent radical of the following general formula

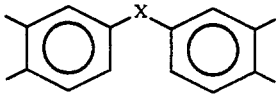

where X is —C(=O)— or —C(CF$_3$)$_2$—.

3. Polymer of claim 1 having a defined glass transition temperature.

4. Polymer of claim 1 having no defined glass transition temperature.

5. Polymer of claim 1 which is solid at room temperature.

6. Polymer of claim 1 having catastrophic degradation occurring at a temperature range of between 500° C. and 600° C.

7. Polymer of claim 1 having catastrophic degradation at a temperature in the range of about 550° C. to 600° C.

8. A thermoplastic prepolymer consisting essentially of two or more repeating units of the general formula:

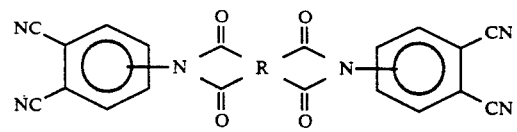

wherein R is a substituted or unsubstituted aromatic tetravalent radical selected form the group consisting of:

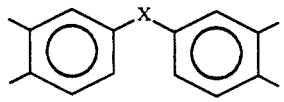

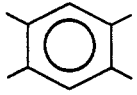

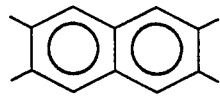

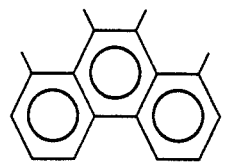

where X is —C(=O)—, —S—, —S(=O)$_2$—, —C(CH$_3$)$_2$—, —C(CF$_3$)$_2$—, or a partially or perhalogen alkylene radical of 1 to 6 carbon atoms.
9. Polymer of claim 8 wherein R is a substituted or unsubstituted aromatic tetravalent radical having the following general formula:
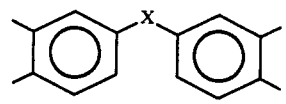
where X is —C(=C)— or —C(CF$_3$)$_2$—.
* * * * *